United States Patent
Reznik

(10) Patent No.: US 7,400,692 B2
(45) Date of Patent: Jul. 15, 2008

(54) TELESCOPING WINDOW BASED EQUALIZATION

(75) Inventor: Alexander Reznik, Titusville, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 471 days.

(21) Appl. No.: 11/018,097

(22) Filed: Dec. 20, 2004

(65) Prior Publication Data

US 2005/0152295 A1   Jul. 14, 2005

Related U.S. Application Data

(60) Provisional application No. 60/536,425, filed on Jan. 14, 2004.

(51) Int. Cl.
*H04L 27/00* (2006.01)
*H04L 27/06* (2006.01)

(52) U.S. Cl. .................................... 375/316; 375/343

(58) Field of Classification Search ................ 375/316, 375/340, 343, 130, 140, 142, 144, 147, 148, 375/150; 370/335, 441, 342
See application file for complete search history.

(56) References Cited

U.S. PATENT DOCUMENTS

| | | | |
|---|---|---|---|
| 4,852,090 A | 7/1989 | Borth | |
| 5,146,475 A | 9/1992 | Kubo | |
| 5,272,663 A | 12/1993 | Jones et al. | |
| 5,319,677 A | 6/1994 | Kim | |
| 5,331,666 A | 7/1994 | Dent | |
| 5,353,300 A | 10/1994 | Lee et al. | |
| 5,359,624 A | 10/1994 | Lee et al. | |
| 5,381,443 A | 1/1995 | Borth et al. | |
| 5,412,620 A | 5/1995 | Cafarella et al. | |
| 5,414,699 A | 5/1995 | Lee | |
| 5,425,050 A | 6/1995 | Schreiber et al. | |
| 5,448,206 A | 9/1995 | Newhall | |
| 5,457,704 A | 10/1995 | Hoeher et al. | |
| 5,465,396 A | 11/1995 | Hunsinger et al. | |
| 5,493,563 A | 2/1996 | Rozanski et al. | |
| 5,511,009 A | 4/1996 | Pastor | |
| 5,515,378 A | 5/1996 | Roy, III et al. | |
| 5,537,474 A | 7/1996 | Brown et al. | |

(Continued)

FOREIGN PATENT DOCUMENTS

| | | | |
|---|---|---|---|
| EP | 0642243 A1 | 9/1993 |
| EP | 0607755 A1 | 12/1993 |
| EP | 0674455 A1 | 10/1994 |
| EP | 0691754 A2 | 1/1996 |
| EP | 0701344 A1 | 3/1996 |

(Continued)

OTHER PUBLICATIONS

Golub et al., "Matrix Computations," 3rd Edition, The Johns Hopkins University Press, Baltimore, MD, pp. 155-159, (1996).

*Primary Examiner*—Tesfaldet Bocure
(74) *Attorney, Agent, or Firm*—Volpe and Koenig, P.C.

(57) ABSTRACT

At least one wireless communication is received and sampled to produce samples. A channel response is estimated corresponding to the at least one wireless communication. An initial channel correlation matrix is produced based on the received samples and the channel response. The initial channel correlation matrix is factorized to produce a Cholesky factor. Forward substitution is performed using the Cholesky factor and received samples to produce initial values for the at least one wireless communication. The Cholesky factor is updated using additional channel correlation matrix values, producing an updated Cholesky factor. Subsequent values for the at least one wireless communication are produced using the updated Cholesky factor.

12 Claims, 2 Drawing Sheets

U.S. PATENT DOCUMENTS

| | | |
|---|---|---|
| 5,553,062 A | 9/1996 | Schilling et al. |
| 5,559,881 A | 9/1996 | Sih |
| 5,572,552 A | 11/1996 | Dent et al. |
| 5,603,081 A | 2/1997 | Raith et al. |
| 5,623,511 A | 4/1997 | Bar-David et al. |
| 5,646,964 A | 7/1997 | Ushirokawa et al. |
| 5,646,991 A | 7/1997 | Sih |
| 5,655,215 A | 8/1997 | Diachina et al. |
| 5,668,875 A | 9/1997 | Brown et al. |
| 5,673,294 A | 9/1997 | Namekata |
| 5,680,419 A | 10/1997 | Bottomley |
| 5,687,229 A | 11/1997 | Sih |
| 5,692,006 A | 11/1997 | Ross |
| 5,694,416 A | 12/1997 | Johnson |
| 5,719,852 A | 2/1998 | Schilling et al. |
| 5,724,378 A | 3/1998 | Miki et al. |
| 5,729,540 A | 3/1998 | Wegrzyn |
| 5,739,788 A | 4/1998 | Dybdal et al. |
| 5,745,525 A | 4/1998 | Hunsinger et al. |
| 5,757,821 A | 5/1998 | Jamal et al. |
| 5,757,853 A | 5/1998 | Tsujimoto |
| 5,768,254 A | 6/1998 | Papadopoulos et al. |
| 5,790,606 A | 8/1998 | Dent |
| 5,793,820 A | 8/1998 | Vander Mey |
| 5,796,814 A | 8/1998 | Brajal et al. |
| 5,799,084 A | 8/1998 | Gallagher et al. |
| 5,805,584 A | 9/1998 | Kingston et al. |
| 5,809,058 A | 9/1998 | Sato |
| 5,818,868 A | 10/1998 | Gaudenzi et al. |
| 5,822,380 A | 10/1998 | Bottomley |
| 5,822,701 A | 10/1998 | Tomisato et al. |
| 5,828,658 A | 10/1998 | Ottersten et al. |
| 5,831,984 A | 11/1998 | Hottinen |
| 5,844,951 A | 12/1998 | Proakis et al. |
| 5,848,105 A | 12/1998 | Gardner et al. |
| 5,867,290 A | 2/1999 | Dutt et al. |
| 5,892,397 A | 4/1999 | Belcher et al. |
| 5,894,473 A | 4/1999 | Dent |
| 5,903,834 A | 5/1999 | Wallstedt et al. |
| 5,905,721 A | 5/1999 | Liu et al. |
| 5,912,876 A | 6/1999 | H'mimy |
| 5,930,369 A | 7/1999 | Cox et al. |
| 5,933,457 A | 8/1999 | Hottinen |
| 5,937,014 A | 8/1999 | Pelin et al. |
| 5,943,425 A | 8/1999 | Mizikovsky |
| 5,956,624 A | 9/1999 | Hunsinger et al. |
| 5,966,411 A | 10/1999 | Struhsaker |
| 5,982,825 A | 11/1999 | Tsujimoto |
| 5,991,308 A | 11/1999 | Fuhrmann et al. |
| 5,995,829 A | 11/1999 | Broderick |
| 6,011,812 A | 1/2000 | Laakso et al. |
| 6,026,130 A | 2/2000 | Rahmatullah et al. |
| 6,038,440 A | 3/2000 | Wu |
| 6,047,023 A | 4/2000 | Arnstein |
| 6,047,071 A | 4/2000 | Shah |
| 6,064,689 A | 5/2000 | Vollmer et al. |
| 6,069,912 A | 5/2000 | Sawahashi et al. |
| 6,078,611 A | 6/2000 | La Rosa et al. |
| 6,081,566 A | 6/2000 | Molnar et al. |
| 6,094,464 A | 7/2000 | Ebringer et al. |
| 6,097,753 A | 8/2000 | Ko |
| 6,108,424 A | 8/2000 | Pitiot |
| 6,108,517 A | 8/2000 | Arsian et al. |
| 6,125,137 A | 9/2000 | Wang et al. |
| 6,128,389 A | 10/2000 | Chan et al. |
| 6,137,785 A | 10/2000 | Bar-Ness |
| 6,137,824 A | 10/2000 | Liu |
| 6,137,843 A | 10/2000 | Chennakeshu et al. |
| 6,141,334 A | 10/2000 | Flanagan et al. |
| 6,148,041 A | 11/2000 | Dent |
| 6,160,801 A | 12/2000 | Uchida et al. |
| 6,161,209 A | 12/2000 | Moher |
| 6,175,588 B1 | 1/2001 | Visotsky et al. |
| 6,181,794 B1 | 1/2001 | Park et al. |
| 6,195,546 B1 | 2/2001 | Leung et al. |
| 6,195,782 B1 | 2/2001 | Rahmatullah et al. |
| 6,208,295 B1 | 3/2001 | Doğan et al. |
| 6,208,683 B1 | 3/2001 | Mizuguchi et al. |
| 6,215,762 B1 | 4/2001 | Dent |
| 6,215,814 B1 | 4/2001 | Ylitalo et al. |
| 6,215,983 B1 | 4/2001 | Dogan et al. |
| 6,219,341 B1 | 4/2001 | Varanasi |
| 6,240,099 B1 | 5/2001 | Lim et al. |
| 6,240,282 B1 | 5/2001 | Kleider et al. |
| 6,246,698 B1 | 6/2001 | Kumar |
| 6,259,688 B1 | 7/2001 | Schilling et al. |
| 6,259,720 B1 | 7/2001 | Buss et al. |
| 6,269,075 B1 | 7/2001 | Tran |
| 6,289,005 B1 | 9/2001 | Katz |
| 6,307,851 B1 | 10/2001 | Jung et al. |
| 6,310,704 B1 | 10/2001 | Dogan et al. |
| 6,311,043 B1 | 10/2001 | Haardt et al. |
| 6,317,424 B1 | 11/2001 | Euscher |
| 6,320,919 B1 | 11/2001 | Khayrallah et al. |
| 6,321,066 B1 | 11/2001 | Katz et al. |
| 6,321,082 B1 | 11/2001 | Katz |
| 6,335,954 B1 | 1/2002 | Bottomley et al. |
| 6,353,604 B2 | 3/2002 | Grimwood et al. |
| 6,356,555 B1 | 3/2002 | Rakib et al. |
| 6,363,104 B1 | 3/2002 | Bottomley |
| 6,369,757 B1 | 4/2002 | Song et al. |
| 6,373,888 B1 | 4/2002 | Lindoff |
| 6,373,910 B1 | 4/2002 | Kingston et al. |
| 6,377,611 B1 | 4/2002 | Hwang |
| 6,381,461 B1 | 4/2002 | Besson et al. |
| 6,392,595 B1 | 5/2002 | Katz et al. |
| 6,396,801 B1 | 5/2002 | Upton et al. |
| 6,400,761 B1 | 6/2002 | Smee et al. |
| 6,400,781 B1 | 6/2002 | Vandendorpe et al. |
| 6,404,803 B1 | 6/2002 | Wang et al. |
| 6,426,973 B1 | 7/2002 | Madhow et al. |
| 6,445,692 B1 | 9/2002 | Tsatsanis |
| 6,456,647 B1 | 9/2002 | Banister |
| 6,463,048 B1 | 10/2002 | Garyantes |
| 6,470,044 B1 | 10/2002 | Kowalski |
| 6,470,047 B1 | 10/2002 | Kleinerman et al. |
| 6,470,192 B1 | 10/2002 | Karisson et al. |
| 6,473,415 B1 | 10/2002 | Kim et al. |
| 6,473,609 B1 | 10/2002 | Schwartz et al. |
| 6,483,866 B1 | 11/2002 | Suzuki |
| 6,484,285 B1 | 11/2002 | Dent |
| 6,487,402 B1 | 11/2002 | Faus et al. |
| 6,490,451 B1 | 12/2002 | Denman et al. |
| 6,492,942 B1 | 12/2002 | Kezys |
| 6,501,788 B1 | 12/2002 | Wang et al. |
| 6,501,803 B1 | 12/2002 | Alamouti et al. |
| 6,515,980 B1 | 2/2003 | Bottomley |
| 6,529,495 B1 | 3/2003 | Aazhang et al. |
| 6,529,709 B1 | 3/2003 | Shen et al. |
| 6,539,067 B1 | 3/2003 | Luschi et al. |
| 6,549,151 B1 | 4/2003 | Kober et al. |
| 6,553,012 B1 | 4/2003 | Katz |
| 6,556,634 B1 | 4/2003 | Dent |
| 6,556,682 B1 | 4/2003 | Gilloire et al. |
| 6,563,858 B1 | 5/2003 | Fakatselis et al. |
| 6,564,037 B1 | 5/2003 | Sweatman et al. |
| 6,570,910 B1 | 5/2003 | Bottomley et al. |
| 6,570,918 B1 | 5/2003 | Rademacher |
| 6,574,270 B1 | 6/2003 | Madkour et al. |
| 6,577,606 B1 | 6/2003 | Lee et al. |
| 6,603,801 B1 | 8/2003 | Andren et al. |
| 6,606,314 B1 | 8/2003 | Bahrenburg et al. |
| 6,614,836 B1 | 9/2003 | Halford et al. |
| 6,618,431 B1 | 9/2003 | Lee |

| Patent/Publication | Date | Name |
|---|---|---|
| 6,618,433 B1 | 9/2003 | Yellin |
| 6,621,808 B1 | 9/2003 | Sadri |
| 6,636,561 B1 | 10/2003 | Hudson |
| 6,643,526 B1 | 11/2003 | Katz |
| 6,647,070 B1 | 11/2003 | Shalvi et al. |
| 6,647,077 B1 | 11/2003 | Shan et al. |
| 6,650,617 B1 | 11/2003 | Belotserkovsky et al. |
| 6,650,881 B1 | 11/2003 | Dogan |
| 6,658,047 B1 | 12/2003 | Komulainen et al. |
| 6,658,269 B1 | 12/2003 | Golemon et al. |
| 6,658,619 B1 | 12/2003 | Chen |
| 6,665,349 B1 | 12/2003 | Cherubini et al. |
| 6,665,530 B1 | 12/2003 | Broyles et al. |
| 6,678,310 B1 | 1/2004 | Andren et al. |
| 6,680,969 B1 | 1/2004 | Molnar et al. |
| 6,683,924 B1 | 1/2004 | Ottosson et al. |
| 6,684,065 B2 | 1/2004 | Bult et al. |
| 6,694,154 B1 | 2/2004 | Molnar et al. |
| 6,697,441 B1 | 2/2004 | Bottemley et al. |
| 6,697,633 B1 | 2/2004 | Dogan et al. |
| 6,700,919 B1 | 3/2004 | Papasakellariou |
| 6,700,923 B1 | 3/2004 | Dowling et al. |
| 6,700,924 B1 | 3/2004 | Marzouki |
| 6,700,929 B1 | 3/2004 | Shan et al. |
| 6,704,376 B2 | 3/2004 | Mills et al. |
| 6,707,864 B2 | 3/2004 | Kim |
| 6,714,585 B1 | 3/2004 | Wang et al. |
| 6,721,293 B1 | 4/2004 | Komulainen et al. |
| 6,721,371 B1 | 4/2004 | Barham et al. |
| 6,724,743 B1 | 4/2004 | Pigeonnat |
| 6,728,324 B1 | 4/2004 | Shan et al. |
| 6,729,929 B1 | 5/2004 | Sayers et al. |
| 6,731,622 B1 | 5/2004 | Frank et al. |
| 6,731,700 B1 | 5/2004 | Yakhnich et al. |
| 6,741,637 B1 | 5/2004 | Shen et al. |
| 6,741,856 B2 | 5/2004 | McKenna et al. |
| 6,744,320 B2 | 6/2004 | Nguyen et al. |
| 6,744,806 B1 | 6/2004 | Moore et al. |
| 6,745,052 B2 | 6/2004 | Corbaton et al. |
| 6,745,352 B2 | 6/2004 | Cheng |
| 6,751,250 B2 | 6/2004 | Kirke et al. |
| 6,754,264 B1 | 6/2004 | Ben Rached et al. |
| 6,765,931 B1 | 7/2004 | Rabenko et al. |
| 6,768,714 B1 | 7/2004 | Heinonen et al. |
| 6,768,747 B1 | 7/2004 | Dogan |
| 7,050,513 B1 * | 5/2006 | Yakhnich ............... 375/341 |
| 2001/0001616 A1 | 5/2001 | Rakib et al. |
| 2001/0017883 A1 | 8/2001 | Tiirola et al. |
| 2001/0028677 A1 | 10/2001 | Wang et al. |
| 2001/0030993 A1 | 10/2001 | Bottomley et al. |
| 2001/0033583 A1 | 10/2001 | Rabenko et al. |
| 2001/0036223 A1 | 11/2001 | Webster et al. |
| 2001/0038665 A1 | 11/2001 | Baltersee et al. |
| 2001/0038674 A1 | 11/2001 | Trans |
| 2001/0050926 A1 | 12/2001 | Kumar |
| 2002/0001294 A1 | 1/2002 | Amouris |
| 2002/0003846 A1 | 1/2002 | Khayrallah et al. |
| 2002/0009135 A1 | 1/2002 | Omura et al. |
| 2002/0018450 A1 | 2/2002 | McKenna et al. |
| 2002/0018529 A1 | 2/2002 | Dabak et al. |
| 2002/0019228 A1 | 2/2002 | McKenna et al. |
| 2002/0021747 A1 | 2/2002 | Sequeira |
| 2002/0021750 A1 | 2/2002 | Belotserkovsky et al. |
| 2002/0027957 A1 | 3/2002 | Paulraj et al. |
| 2002/0028655 A1 | 3/2002 | Rosener et al. |
| 2002/0033766 A1 | 3/2002 | Pratt |
| 2002/0037027 A1 | 3/2002 | Medlock et al. |
| 2002/0037028 A1 | 3/2002 | Baltersee et al. |
| 2002/0037716 A1 | 3/2002 | McKenna et al. |
| 2002/0037733 A1 | 3/2002 | McKenna et al. |
| 2002/0039907 A1 | 4/2002 | McKenna et al. |
| 2002/0041637 A1 | 4/2002 | Smart et al. |
| 2002/0044540 A1 | 4/2002 | Mottier et al. |
| 2002/0045432 A1 | 4/2002 | Yoshida |
| 2002/0045462 A1 | 4/2002 | Mottier |
| 2002/0051433 A1 | 5/2002 | Affes et al. |
| 2002/0054621 A1 | 5/2002 | Kyeong et al. |
| 2002/0054623 A1 | 5/2002 | Wang et al. |
| 2002/0057660 A1 | 5/2002 | Park et al. |
| 2002/0057730 A1 | 5/2002 | Karisson et al. |
| 2002/0060999 A1 | 5/2002 | Ma et al. |
| 2002/0064139 A1 | 5/2002 | Bist et al. |
| 2002/0067761 A1 | 6/2002 | Kong et al. |
| 2002/0067762 A1 | 6/2002 | Neufeld et al. |
| 2002/0072336 A1 | 6/2002 | Mottier |
| 2002/0075832 A1 | 6/2002 | Kim et al. |
| 2002/0080746 A1 | 6/2002 | Kim et al. |
| 2002/0080859 A1 | 6/2002 | Mottier |
| 2002/0080863 A1 | 6/2002 | Nielsen |
| 2002/0089953 A1 | 7/2002 | Kim et al. |
| 2002/0089955 A1 | 7/2002 | Kim et al. |
| 2002/0093927 A1 | 7/2002 | Kim et al. |
| 2002/0097699 A1 | 7/2002 | Kim et al. |
| 2002/0098864 A1 | 7/2002 | Mukai et al. |
| 2002/0101845 A1 | 8/2002 | Kim et al. |
| 2002/0105928 A1 | 8/2002 | Kapoor et al. |
| 2002/0109631 A1 | 8/2002 | Li et al. |
| 2002/0110108 A1 | 8/2002 | Kim et al. |
| 2002/0110206 A1 | 8/2002 | Becker et al. |
| 2002/0114410 A1 | 8/2002 | Brunel |
| 2002/0118784 A1 | 8/2002 | Teo et al. |
| 2002/0119803 A1 | 8/2002 | Bitterlich et al. |
| 2002/0122392 A1 | 9/2002 | Elezabi et al. |
| 2002/0122406 A1 | 9/2002 | Chillariga et al. |
| 2002/0122498 A1 | 9/2002 | Dogan |
| 2002/0122510 A1 | 9/2002 | Yakhnich et al. |
| 2002/0126619 A1 | 9/2002 | De et al. |
| 2002/0126644 A1 | 9/2002 | Turpin et al. |
| 2002/0126740 A1 | 9/2002 | Giannakis et al. |
| 2002/0126773 A1 | 9/2002 | Brunel |
| 2002/0126779 A1 | 9/2002 | Denno |
| 2002/0131384 A1 | 9/2002 | De et al. |
| 2002/0136158 A1 | 9/2002 | Frank |
| 2002/0136160 A1 | 9/2002 | De et al. |
| 2002/0137546 A1 | 9/2002 | Miya et al. |
| 2002/0141373 A1 | 10/2002 | De et al. |
| 2002/0141486 A1 | 10/2002 | Bottomley et al. |
| 2002/0145989 A1 | 10/2002 | De et al. |
| 2002/0146044 A1 | 10/2002 | Esmailzadeh et al. |
| 2002/0146062 A1 | 10/2002 | Bachu et al. |
| 2002/0150109 A1 | 10/2002 | Agee |
| 2002/0150182 A1 | 10/2002 | Dogan et al. |
| 2002/0150187 A1 | 10/2002 | Chugg et al. |
| 2002/0154620 A1 | 10/2002 | Azenkot et al. |
| 2002/0154704 A1 | 10/2002 | Reshef |
| 2002/0163977 A1 | 11/2002 | Kobayakawa |
| 2002/0166124 A1 | 11/2002 | Gurantz et al. |
| 2002/0172265 A1 | 11/2002 | Kenney |
| 2002/0173336 A1 | 11/2002 | Ranta et al. |
| 2002/0176393 A1 | 11/2002 | Maruyama |
| 2002/0176521 A1 | 11/2002 | Kirke et al. |
| 2002/0177427 A1 | 11/2002 | Nadgauda et al. |
| 2002/0177447 A1 | 11/2002 | Walton et al. |
| 2002/0181388 A1 | 12/2002 | Jain et al. |
| 2002/0181430 A1 | 12/2002 | Thomas et al. |
| 2002/0181555 A1 | 12/2002 | Roumy et al. |
| 2002/0181557 A1 | 12/2002 | Fujii |
| 2002/0181561 A1 | 12/2002 | Sano |
| 2002/0186650 A1 | 12/2002 | Castelain |
| 2002/0186707 A1 | 12/2002 | Roumy et al. |
| 2002/0186761 A1 | 12/2002 | Corbaton et al. |
| 2002/0190786 A1 | 12/2002 | Yoon et al. |
| 2002/0191568 A1 | 12/2002 | Ghosh |
| 2002/0191582 A1 | 12/2002 | Miya et al. |
| 2002/0196871 A1 | 12/2002 | Nishio et al. |
| 2003/0002568 A1 | 1/2003 | Dabak et al. |

| | | |
|---|---|---|
| 2003/0012263 A1 | 1/2003 | Lu |
| 2003/0013468 A1 | 1/2003 | Khatri |
| 2003/0016640 A1 | 1/2003 | Onggosanusi et al. |
| 2003/0016770 A1 | 1/2003 | Trans et al. |
| 2003/0021335 A1 | 1/2003 | De et al. |
| 2003/0022636 A1 | 1/2003 | Ylitalo et al. |
| 2003/0022680 A1 | 1/2003 | Shreve |
| 2003/0026236 A1 | 2/2003 | De et al. |
| 2003/0026325 A1 | 2/2003 | De et al. |
| 2003/0026326 A1 | 2/2003 | Jayaraman et al. |
| 2003/0026345 A1 | 2/2003 | Muharemovic et al. |
| 2003/0026349 A1 | 2/2003 | Onggosanusi et al. |
| 2003/0027598 A1 | 2/2003 | Corbaton et al. |
| 2003/0035469 A1 | 2/2003 | Frank et al. |
| 2003/0036359 A1 | 2/2003 | Dent et al. |
| 2003/0039302 A1 | 2/2003 | Castelain et al. |
| 2003/0048800 A1 | 3/2003 | Kilfoyle et al. |
| 2003/0053524 A1 | 3/2003 | Dent |
| 2003/0053571 A1 | 3/2003 | Belotserkovsky et al. |
| 2003/0058929 A1 | 3/2003 | Cox et al. |
| 2003/0063680 A1 | 4/2003 | Nedic et al. |
| 2003/0067968 A1 | 4/2003 | Papasakellariou et al. |
| 2003/0067971 A1 | 4/2003 | Miyoshi et al. |
| 2003/0076872 A1 | 4/2003 | Jalloul et al. |
| 2003/0076875 A1 | 4/2003 | Oates |
| 2003/0076900 A1 | 4/2003 | Magee et al. |
| 2003/0078025 A1 | 4/2003 | Smee et al. |
| 2003/0081701 A1 | 5/2003 | Pick et al. |
| 2003/0081781 A1 | 5/2003 | Jensen et al. |
| 2003/0086515 A1 | 5/2003 | Trans et al. |
| 2003/0087622 A1 | 5/2003 | Jayaraman et al. |
| 2003/0091007 A1 | 5/2003 | Becker et al. |
| 2003/0092403 A1 | 5/2003 | Shapira et al. |
| 2003/0092447 A1 | 5/2003 | Bottomley et al. |
| 2003/0092456 A1 | 5/2003 | Dent |
| 2003/0095529 A1 | 5/2003 | Petre et al. |
| 2003/0095531 A1 | 5/2003 | Soerensen et al. |
| 2003/0095585 A1 | 5/2003 | Huh et al. |
| 2003/0095586 A1 | 5/2003 | Geers |
| 2003/0099216 A1 | 5/2003 | Nilsson et al. |
| 2003/0108091 A1 | 6/2003 | Nishio et al. |
| 2003/0109225 A1 | 6/2003 | Aldajani et al. |
| 2003/0112796 A1 | 6/2003 | Kwan |
| 2003/0112901 A1 | 6/2003 | Gupta |
| 2003/0114125 A1 | 6/2003 | Sourour et al. |
| 2003/0114126 A1 | 6/2003 | Wang et al. |
| 2003/0123525 A1 | 7/2003 | Smee et al. |
| 2003/0123585 A1 | 7/2003 | Yen |
| 2003/0123586 A1 | 7/2003 | Yen |
| 2003/0125090 A1 | 7/2003 | Zeira |
| 2003/0125091 A1 | 7/2003 | Choi et al. |
| 2003/0126545 A1 | 7/2003 | Tan |
| 2003/0128770 A1 | 7/2003 | Chenu-Tournier et al. |
| 2003/0129984 A1 | 7/2003 | Dent |
| 2003/0133421 A1 | 7/2003 | Sundar et al. |
| 2003/0133424 A1 | 7/2003 | Liang et al. |
| 2003/0134636 A1 | 7/2003 | Sundar et al. |
| 2003/0134638 A1 | 7/2003 | Sundar et al. |
| 2003/0134650 A1 | 7/2003 | Sundar et al. |
| 2003/0137426 A1 | 7/2003 | Anthony et al. |
| 2003/0138035 A1 | 7/2003 | Mills |
| 2003/0139139 A1 | 7/2003 | Onggosanusi et al. |
| 2003/0139189 A1 | 7/2003 | Alexander, Jr. |
| 2003/0142726 A1 | 7/2003 | Eltawil et al. |
| 2003/0142732 A1 | 7/2003 | Moshavi et al. |
| 2003/0142762 A1 | 7/2003 | Burke |
| 2003/0146870 A1 | 8/2003 | Guo et al. |
| 2003/0147455 A1 | 8/2003 | Simoni et al. |
| 2003/0152099 A1 | 8/2003 | Chun et al. |
| 2003/0153273 A1 | 8/2003 | Ebert et al. |
| 2003/0153322 A1 | 8/2003 | Burke et al. |
| 2003/0156635 A1 | 8/2003 | Fernandez-Corbaton et al. |
| 2003/0157954 A1 | 8/2003 | Medvedev et al. |
| 2003/0161282 A1 | 8/2003 | Medvedev et al. |
| 2003/0161383 A1 | 8/2003 | Mower et al. |
| 2003/0161421 A1 | 8/2003 | Schmidt et al. |
| 2003/0161422 A1 | 8/2003 | Bi |
| 2003/0166398 A1 | 9/2003 | Netanel |
| 2003/0174794 A1 | 9/2003 | Xu et al. |
| 2003/0179698 A1 | 9/2003 | Lu |
| 2003/0179812 A1 | 9/2003 | Carbone et al. |
| 2003/0193970 A1 | 10/2003 | Kim et al. |
| 2003/0198210 A1 | 10/2003 | Haim |
| 2003/0198305 A1 | 10/2003 | Taylor et al. |
| 2003/0202499 A1 | 10/2003 | Thron et al. |
| 2003/0202569 A1 | 10/2003 | Kim et al. |
| 2003/0203723 A1 | 10/2003 | Persson et al. |
| 2003/0206575 A1 | 11/2003 | Bertrand et al. |
| 2003/0215003 A1 | 11/2003 | Bottomley et al. |
| 2003/0215004 A1 | 11/2003 | Vihriala |
| 2003/0216154 A1 | 11/2003 | Mennenga et al. |
| 2003/0218998 A1 | 11/2003 | Kim et al. |
| 2003/0219064 A1 | 11/2003 | Pan et al. |
| 2003/0219065 A1 | 11/2003 | Zeira |
| 2003/0220122 A1 | 11/2003 | Lim et al. |
| 2003/0223398 A1 | 12/2003 | Haim et al. |
| 2003/0223489 A1 | 12/2003 | Smee et al. |
| 2003/0227960 A1 | 12/2003 | Papaskellariou |
| 2003/0227962 A1 | 12/2003 | Hintz-Madsen |
| 2004/0001426 A1 | 1/2004 | Mailaender et al. |
| 2004/0001528 A1 | 1/2004 | Kim et al. |
| 2004/0008803 A1 | 1/2004 | Aldrovandi et al. |
| 2004/0013171 A1 | 1/2004 | Pan et al. |
| 2004/0013205 A1 | 1/2004 | Brunel |
| 2004/0014424 A1 | 1/2004 | Kristensson et al. |
| 2004/0015529 A1 | 1/2004 | Tanrikulu et al. |
| 2004/0017843 A1 | 1/2004 | Fitton et al. |
| 2004/0022179 A1 | 2/2004 | Giannakis et al. |
| 2004/0028013 A1 | 2/2004 | Fitton et al. |
| 2004/0028121 A1 | 2/2004 | Fitton et al. |
| 2004/0028157 A1 | 2/2004 | Aoki et al. |
| 2004/0032848 A1 | 2/2004 | Papasakellariou |
| 2004/0032900 A1 | 2/2004 | Homg et al. |
| 2004/0033791 A1 | 2/2004 | Schmidl et al. |
| 2004/0037354 A1 | 2/2004 | Jayaraman et al. |
| 2004/0037380 A1 | 2/2004 | Shan |
| 2004/0038653 A1 | 2/2004 | Claussen et al. |
| 2004/0042531 A1 | 3/2004 | Arikan et al. |
| 2004/0042537 A1 | 3/2004 | Frank |
| 2004/0043788 A1 | 3/2004 | Mittal |
| 2004/0047401 A1 | 3/2004 | Keller et al. |
| 2004/0047403 A1 | 3/2004 | Choi et al. |
| 2004/0052303 A1 | 3/2004 | Noguet et al. |
| 2004/0062302 A1 | 4/2004 | Fujii et al. |
| 2004/0062317 A1 | 4/2004 | Uesugi et al. |
| 2004/0068748 A1 | 4/2004 | Currivan et al. |
| 2004/0076224 A1 | 4/2004 | Onggosanusi et al. |
| 2004/0076244 A1 | 4/2004 | Juntti et al. |
| 2004/0085890 A1 | 5/2004 | Love et al. |
| 2004/0086035 A1 | 5/2004 | Upton et al. |
| 2004/0086036 A1 | 5/2004 | Eckhardt et al. |
| 2004/0086038 A1 | 5/2004 | Kilbank |
| 2004/0091023 A1 | 5/2004 | Chen et al. |
| 2004/0097204 A1 | 5/2004 | Jung et al. |
| 2004/0100403 A1 | 5/2004 | Park et al. |
| 2004/0101032 A1 | 5/2004 | Dabak et al. |
| 2004/0101068 A1 | 5/2004 | Wang et al. |
| 2004/0101072 A1 | 5/2004 | Fitton et al. |
| 2004/0105489 A1 | 6/2004 | Kim et al. |
| 2004/0105515 A1 | 6/2004 | Mo et al. |
| 2004/0114544 A1 | 6/2004 | Chiuch et al. |
| 2004/0114670 A1 | 6/2004 | Cranford, Jr. et al. |
| 2004/0114674 A1 | 6/2004 | Lotter et al. |
| 2004/0114695 A1 | 6/2004 | Astely et al. |
| 2004/0116078 A1 | 6/2004 | Rooyen et al. |
| 2004/0116122 A1 | 6/2004 | Zeira et al. |

| | | | |
|---|---|---|---|
| 2004/0120308 A1 | 6/2004 | LeBlanc | |
| 2004/0125785 A1 | 7/2004 | DiFazio et al. | |
| 2004/0125859 A1 | 7/2004 | Green et al. | |
| 2004/0125863 A1 | 7/2004 | Ghosh | |
| 2004/0132430 A1 | 7/2004 | Shino et al. | |
| 2004/0136316 A1 | 7/2004 | Kwak et al. | |
| 2004/0136472 A1 | 7/2004 | Vigoda et al. | |
| 2004/0141480 A1 | 7/2004 | Kim et al. | |
| 2004/0141565 A1 | 7/2004 | Kwak et al. | |
| 2006/0176941 A1* | 8/2006 | Nieto et al. | 375/152 |
| 2006/0176983 A1* | 8/2006 | Wadsworth et al. | 375/343 |

FOREIGN PATENT DOCUMENTS

| | | |
|---|---|---|
| EP | 0715421 A2 | 6/1996 |
| EP | 0755141 A2 | 1/1997 |
| EP | 0762671 A1 | 3/1997 |
| EP | 0766468 A2 | 4/1997 |
| EP | 0782275 A2 | 7/1997 |
| EP | 0784311 A1 | 7/1997 |
| EP | 0806844 A1 | 11/1997 |
| EP | 0858175 A2 | 2/1998 |
| EP | 0851600 A2 | 7/1998 |
| EP | 0858186 A2 | 8/1998 |
| EP | 0883318 A1 | 12/1998 |
| EP | 0884857 A2 | 12/1998 |
| EP | 0889661 A2 | 1/1999 |
| EP | 0892508 A2 | 1/1999 |
| EP | 1303058 A2 | 5/1999 |
| EP | 0926913 A2 | 6/1999 |
| EP | 0932263 A2 | 7/1999 |
| EP | 0936749 A1 | 8/1999 |
| EP | 0955742 A2 | 11/1999 |
| EP | 0957592 A2 | 11/1999 |
| EP | 0955783 A3 | 1/2000 |
| EP | 0971485 A1 | 1/2000 |
| EP | 0977393 A1 | 2/2000 |
| EP | 0978951 A2 | 2/2000 |
| EP | 0980149 A2 | 2/2000 |
| EP | 0981206 A1 | 2/2000 |
| EP | 0987868 A2 | 3/2000 |
| EP | 0994570 A1 | 4/2000 |
| EP | 1003297 A2 | 5/2000 |
| EP | 1011211 A1 | 6/2000 |
| EP | 1017183 A2 | 7/2000 |
| EP | 1022862 A2 | 7/2000 |
| EP | 1035681 A2 | 9/2000 |
| EP | 1017182 A3 | 10/2000 |
| EP | 1059784 A1 | 12/2000 |
| EP | 1071222 A2 | 1/2001 |
| EP | 1081980 A1 | 3/2001 |
| EP | 1091506 A3 | 5/2001 |
| EP | 1107524 A2 | 6/2001 |
| EP | 1124346 A1 | 8/2001 |
| EP | 1146657 A1 | 10/2001 |
| EP | 1156592 A2 | 11/2001 |
| EP | 1164734 A1 | 12/2001 |
| EP | 1175022 A2 | 1/2002 |
| EP | 1179891 A2 | 2/2002 |
| EP | 1220355 A1 | 7/2002 |
| EP | 1227598 A2 | 7/2002 |
| EP | 1229668 A2 | 8/2002 |
| EP | 1244232 A1 | 9/2002 |
| EP | 1271835 A2 | 1/2003 |
| EP | 1274176 A1 | 1/2003 |
| EP | 1274177 A2 | 1/2003 |
| EP | 1276251 A1 | 1/2003 |
| EP | 1289162 A2 | 3/2003 |
| EP | 1292048 A1 | 3/2003 |
| EP | 1292049 A2 | 3/2003 |
| EP | 1294150 A1 | 3/2003 |
| EP | 1296462 A1 | 3/2003 |
| EP | 1303092 A2 | 4/2003 |
| EP | 1304815 A2 | 4/2003 |
| EP | 1151553 B1 | 5/2003 |
| EP | 1306979 A1 | 5/2003 |
| EP | 1306980 A1 | 5/2003 |
| EP | 1309096 A1 | 5/2003 |
| EP | 1318613 A2 | 6/2003 |
| EP | 1320200 A1 | 6/2003 |
| EP | 1335504 A2 | 8/2003 |
| EP | 1335518 A1 | 8/2003 |
| EP | 1339196 A1 | 8/2003 |
| EP | 1341319 A1 | 9/2003 |
| EP | 1345338 A1 | 9/2003 |
| EP | 1351426 A1 | 10/2003 |
| EP | 1353451 A1 | 10/2003 |
| EP | 1357714 A1 | 10/2003 |
| EP | 1359679 A2 | 11/2003 |
| EP | 1363405 A1 | 11/2003 |
| EP | 1365518 A1 | 11/2003 |
| EP | 1367846 A1 | 12/2003 |
| EP | 1372308 A1 | 12/2003 |
| EP | 1383263 A1 | 1/2004 |
| EP | 1376896 A1 | 2/2004 |
| EP | 1392017 A1 | 2/2004 |
| EP | 1395078 A2 | 3/2004 |
| EP | 1396943 A1 | 3/2004 |
| EP | 1404047 A2 | 3/2004 |
| EP | 1406395 A2 | 4/2004 |
| EP | 1422596 A2 | 5/2004 |
| EP | 1422850 A1 | 5/2004 |
| EP | 1427155 A2 | 6/2004 |
| EP | 1427159 A2 | 6/2004 |
| EP | 1432168 A1 | 6/2004 |
| EP | 1434369 A2 | 6/2004 |
| EP | 1434416 A2 | 6/2004 |
| EP | 1437842 A1 | 7/2004 |
| EP | 1439676 A2 | 7/2004 |
| WO | 88/05981 | 8/1988 |
| WO | 94/00918 | 1/1994 |
| WO | 94/01956 | 1/1994 |
| WO | 94/08418 | 4/1994 |
| WO | 94/16506 | 7/1994 |
| WO | 94/29985 | 12/1994 |
| WO | 95/01033 A1 | 1/1995 |
| WO | 95/04413 | 2/1995 |
| WO | 95/08890 | 3/1995 |
| WO | 95/12930 A1 | 5/1995 |
| WO | 95/12934 | 5/1995 |
| WO | 95/09493 | 6/1995 |
| WO | 95/20842 | 8/1995 |
| WO | 95/21511 | 8/1995 |
| WO | 95/22209 | 8/1995 |
| WO | 95/22818 | 8/1995 |
| WO | 95/26094 A1 | 9/1995 |
| WO | 95/27349 | 10/1995 |
| WO | 95/34140 | 12/1995 |
| WO | 96/06487 | 2/1996 |
| WO | 96/11533 | 4/1996 |
| WO | 96/11534 | 4/1996 |
| WO | 96/37062 | 11/1996 |
| WO | 97/05709 | 2/1997 |
| WO | 97/08861 | 3/1997 |
| WO | 97/13353 | 4/1997 |
| WO | 97/13386 | 4/1997 |
| WO | 97/19522 | 5/1997 |
| WO | 97/24816 | 7/1997 |
| WO | 97/32413 | 9/1997 |
| WO | 97/34421 | 9/1997 |
| WO | 97/37427 | 10/1997 |
| WO | 97/38540 | 10/1997 |
| WO | 97/41647 | 11/1997 |
| WO | 97/49207 | 12/1997 |
| WO | 98/01960 | 1/1998 |
| WO | 98/18272 | 4/1998 |

| | | | | | | |
|---|---|---|---|---|---|---|
| WO | 98/19493 | 5/1998 | | WO | 02/05447 A2 | 1/2002 |
| WO | 98/24192 | 6/1998 | | WO | 02/05502 A1 | 1/2002 |
| WO | 98/28903 | 7/1998 | | WO | 02/05506 A2 | 1/2002 |
| WO | 98/36596 | 8/1998 | | WO | 02/09297 A2 | 1/2002 |
| WO | 98/36598 | 8/1998 | | WO | 02/09298 A2 | 1/2002 |
| WO | 98/36599 | 8/1998 | | WO | 02/09305 A2 | 1/2002 |
| WO | 98/40970 | 9/1998 | | WO | 02/11304 A2 | 2/2002 |
| WO | 98/47243 A2 | 10/1998 | | WO | 02/11311 A2 | 2/2002 |
| WO | 98/56146 | 12/1998 | | WO | 02/11387 A1 | 2/2002 |
| WO | 98/59518 | 12/1998 | | WO | 02/13491 A2 | 2/2002 |
| WO | 99/04537 | 1/1999 | | WO | 02/17508 A2 | 2/2002 |
| WO | 99/07077 A2 | 2/1999 | | WO | 02/19563 A2 | 3/2002 |
| WO | 99/12283 | 3/1999 | | WO | 02/19738 A2 | 3/2002 |
| WO | 99/14871 | 3/1999 | | WO | 02/21714 A1 | 3/2002 |
| WO | 99/23849 | 5/1999 | | WO | 02/23667 A2 | 3/2002 |
| WO | 99/48308 | 9/1999 | | WO | 02/23751 A1 | 3/2002 |
| WO | 99/52311 | 10/1999 | | WO | 02/23752 A1 | 3/2002 |
| WO | 99/59266 | 11/1999 | | WO | 02/23753 A1 | 3/2002 |
| WO | 99/60720 | 11/1999 | | WO | 02/23754 A2 | 3/2002 |
| WO | 99/62197 | 12/1999 | | WO | 02/23758 A1 | 3/2002 |
| WO | 99/62280 | 12/1999 | | WO | 02/23787 A2 | 3/2002 |
| WO | 99/63677 | 12/1999 | | WO | 02/23824 A2 | 3/2002 |
| WO | 00/16494 | 3/2000 | | WO | 02/25831 A2 | 3/2002 |
| WO | 00/25438 | 5/2000 | | WO | 02/31995 A2 | 3/2002 |
| WO | 00/33472 | 6/2000 | | WO | 02/27961 A2 | 4/2002 |
| WO | 00/35159 | 6/2000 | | WO | 02/29993 A1 | 4/2002 |
| WO | 00/41337 | 7/2000 | | WO | 02/32004 A1 | 4/2002 |
| WO | 00/44111 | 7/2000 | | WO | 02/35719 A2 | 5/2002 |
| WO | 00/44141 | 7/2000 | | WO | 02/35745 A1 | 5/2002 |
| WO | 00/44190 | 7/2000 | | WO | 02/35857 A1 | 5/2002 |
| WO | 00/46922 | 8/2000 | | WO | 02/39610 A2 | 5/2002 |
| WO | 00/48330 | 8/2000 | | WO | 02/43263 A1 | 5/2002 |
| WO | 00/48332 | 8/2000 | | WO | 02/47278 A2 | 6/2002 |
| WO | 00/49720 | 8/2000 | | WO | 02/054601 A1 | 7/2002 |
| WO | 00/51250 A1 | 8/2000 | | WO | 02/054613 A1 | 7/2002 |
| WO | 00/51260 A1 | 8/2000 | | WO | 02/065719 A1 | 8/2002 |
| WO | 00/54418 | 9/2000 | | WO | 02/067444 A1 | 8/2002 |
| WO | 00/62470 | 10/2000 | | WO | 02/073822 A1 | 9/2002 |
| WO | 00/69192 A1 | 11/2000 | | WO | 02/075950 A1 | 9/2002 |
| WO | 00/72459 A1 | 11/2000 | | WO | 02/078205 A1 | 10/2002 |
| WO | 00/74332 A1 | 12/2000 | | WO | 02/080379 A2 | 10/2002 |
| WO | 00/77942 A1 | 12/2000 | | WO | 02/080382 A1 | 10/2002 |
| WO | 00/77994 A1 | 12/2000 | | WO | 02/080432 | 10/2002 |
| WO | 01/05088 A1 | 1/2001 | | WO | 02/082268 A1 | 10/2002 |
| WO | 01/05091 A1 | 1/2001 | | WO | 02/084892 A1 | 10/2002 |
| WO | 01/10065 A1 | 2/2001 | | WO | 02/029977 A2 | 11/2002 |
| WO | 01/13530 A1 | 2/2001 | | WO | 02/093782 A1 | 11/2002 |
| WO | 01/19120 A1 | 3/2001 | | WO | 02/100033 A1 | 12/2002 |
| WO | 01/20801 A1 | 3/2001 | | WO | 03/003604 A1 | 1/2003 |
| WO | 01/20919 A1 | 3/2001 | | WO | 03/005291 A1 | 1/2003 |
| WO | 01/22610 A1 | 3/2001 | | WO | 03/010898 A1 | 2/2003 |
| WO | 01/22710 A2 | 3/2001 | | WO | 03/010899 A1 | 2/2003 |
| WO | 02/19005 A1 | 3/2001 | | WO | 03/013018 A2 | 2/2003 |
| WO | 01/24381 A1 | 4/2001 | | WO | 03/013088 A2 | 2/2003 |
| WO | 01/28174 A1 | 4/2001 | | WO | 03/015306 A1 | 2/2003 |
| WO | 01/29963 A1 | 4/2001 | | WO | 03/021373 A2 | 3/2003 |
| WO | 01/29983 A1 | 4/2001 | | WO | 03/021805 A1 | 3/2003 |
| WO | 01/33791 A1 | 5/2001 | | WO | 03/021812 A1 | 3/2003 |
| WO | 01/39392 A1 | 5/2001 | | WO | 03/028246 A2 | 3/2003 |
| WO | 01/43302 A1 | 6/2001 | | WO | 03/028229 A1 | 4/2003 |
| WO | 01/45287 A1 | 6/2001 | | WO | 03/030552 A1 | 4/2003 |
| WO | 01/45289 A1 | 6/2001 | | WO | 03/034604 A1 | 4/2003 |
| WO | 01/52489 A1 | 7/2001 | | WO | 03/036799 A1 | 5/2003 |
| WO | 01/54303 A1 | 7/2001 | | WO | 03/036867 A1 | 5/2003 |
| WO | 01/56204 A1 | 8/2001 | | WO | 03/041291 A1 | 5/2003 |
| WO | 01/60103 A1 | 8/2001 | | WO | 03/041292 A1 | 5/2003 |
| WO | 01/67665 A2 | 9/2001 | | WO | 03/043236 A1 | 5/2003 |
| WO | 01/69801 A2 | 9/2001 | | WO | 03/052957 A1 | 6/2003 |
| WO | 01/71996 A2 | 9/2001 | | WO | 03/058839 A1 | 7/2003 |
| WO | 01/89107 A1 | 11/2001 | | WO | 03/058871 A1 | 7/2003 |
| WO | 01/91317 A1 | 11/2001 | | WO | 03/061177 A2 | 7/2003 |
| WO | 01/93436 A2 | 12/2001 | | WO | 03/061301 A2 | 7/2003 |
| WO | 02/03092 A1 | 1/2002 | | WO | 03/065605 A1 | 8/2003 |

| | | | | | | |
|---|---|---|---|---|---|---|
| WO | 03/065635 | | 8/2003 | WO | 2004/012366 A1 | 2/2004 |
| WO | 03/073637 | A1 | 9/2003 | WO | 2004/015884 A2 | 2/2004 |
| WO | 03/079759 | A2 | 10/2003 | WO | 2004/015949 A1 | 2/2004 |
| WO | 03/084080 | A2 | 10/2003 | WO | 2004/019447 A2 | 3/2004 |
| WO | 03/084097 | A1 | 10/2003 | WO | 2004/021599 A1 | 3/2004 |
| WO | 03/084254 | A1 | 10/2003 | WO | 2004/021680 A2 | 3/2004 |
| WO | 03/085830 | | 10/2003 | WO | 2004/023671 A1 | 3/2004 |
| WO | 03/090024 | A2 | 10/2003 | WO | 2004/038600 A1 | 5/2004 |
| WO | 03/092236 | A1 | 11/2003 | WO | 2004/038936 A2 | 5/2004 |
| WO | 03/094378 | | 11/2003 | WO | 2004/040779 A2 | 5/2004 |
| WO | 03/101001 | A1 | 12/2003 | WO | 2004/040789 A2 | 5/2004 |
| WO | 03/101012 | A1 | 12/2003 | WO | 2004/040869 A1 | 5/2004 |
| WO | 03/107570 | A1 | 12/2003 | WO | 2004/045103 A1 | 5/2004 |
| WO | 03/107688 | A2 | 12/2003 | WO | 2004/046901 A2 | 6/2004 |
| WO | 04/001893 | A2 | 12/2003 | WO | 2004/047269 A2 | 6/2004 |
| WO | 04/002038 | A1 | 12/2003 | WO | 2004/049595 A1 | 6/2004 |
| WO | 2004/003743 | A1 | 1/2004 | WO | 2004/054101 A1 | 6/2004 |
| WO | 2004/008647 | A2 | 1/2004 | WO | 2004/056002 A1 | 7/2004 |
| WO | 2004/010572 | A1 | 1/2004 | WO | 2004/059878 A1 | 7/2004 |
| WO | 2004/010573 | A1 | 1/2004 | WO | 2004/062158 A2 | 7/2004 |
| WO | 2004/001341 | A1 | 2/2004 | | | |
| WO | 2004/012359 | A2 | 2/2004 | * cited by examiner | | |

TELESCOPING WINDOW BASED EQUALIZATION

CROSS REFERENCE TO RELATED APPLICATION(S)

This application claims priority from U.S. provisional application No. 60/536,425, filed on Jan. 14, 2004, which is incorporated by reference as if fully set forth.

FIELD OF INVENTION

The invention generally relates to wireless communication systems. In particular, the invention relates to data detection in such systems.

BACKGROUND

In wireless communication systems, such as cellular, wide local area networks (WLAN), wide metropolitan area networks (WMAN), personal area networks (PANs), etc, demand for higher data rate services is growing. In such systems, typically a wireless device communicates with a network nodes such as a base station (cellular networks) or access point (APs), although wireless device to wireless device (ad hoc) communications is growing in prevalence.

To accommodate higher and higher data rates, improved receiver performance is desired. One technique for improved receiver performance is a generalized Rake structure. Generalized Rake structures typically have multiple Rake fingers collecting energy from received communications and combining them, such as by using maximal ratio combining (MRC). Another technique uses a normalized least mean squares (NLMS) based approach, such as by using a finite impulse response (FIR) filter. In such a technique, the FIR filter is used to process received communications and a NLMS algorithm is used to adjust the tap values.

Other approaches for implementing receivers use zero forcing (ZF) block linear equalizers and minimum mean square error (MMSE) equalizers. To accurately detect the data using these approaches requires that an infinite number of received samples be used, which is not practical.

One approach for handing an infinite number of samples is a sliding window Cholesky based Equalization. Although Cholesky based equalization is described in the Background, the following is provided to give context to the Detailed Description of the Preferred Embodiments and may contain information that is not publicly known or would constitute prior art.

For data sequence $d=\{d_0, d_1, \ldots\}$, a sequence $r=\{r_0, r_1, \ldots\}$ is given per Equation 1.

$$r = Sd + n \quad \text{Equation 1}$$

n is a zero-mean Gaussian noise sequence with covariance given by the relationships $E[n_i n^*_j]^* = \Sigma_{i,j}$; and S is a linear operator where $$(Sd)_i = \sum_j S_{i,j} d_j.$$

One approach to estimate d from r is a minimum mean square error equalization based approach per Equation 2.

$$d_{MMSE} = (S^H \Sigma^{-1} S + I)^{-1} S^H \Sigma^{-1} r \quad \text{Equation 2}$$

Whenever $N \geq K$ and S is full rank, an alternative estimation procedure often utilized in communications application is a zero-forcing block linear equalization based approach per Equation 3.

$$d_{ZF} = (S^H \Sigma^{-1} S)^{-1} S^H \Sigma^{-1} r \quad \text{Equation 3}$$

Simpler forms of both Equation 2 and Equation 3 can be derived by ignoring noise correlation, $\Sigma^{-1}$.

A solution to Equation 3 can be put into a unified framework by a two step procedure. First, a "matched filtering" operation is performed on the measured ("received") data, as per Equation 4.

$$y = S^H \Sigma^{-1} r \quad \text{Equation 4}$$

The estimate of the original data is obtained by solving for $d$ in a linear K-equation system as per Equation 5.

$$y = Rd \quad \text{Equation 5}$$

R is a symmetric positive definite matrix.

Equation 5 can be solved via the Cholesky decomposition. This involves finding a lower triangular matrix G, such that $R = GG^H$. Equation 5 can be solved by first finding a vector b such as by Equation 6.

$$y = Gb \quad \text{Equation 6}$$

Subsequently, $d$ is derived per Equation 7.

$$b = G^H d \quad \text{Equation 7}$$

Accordingly, solving Equation 5 using Cholesky decomposition is performed in three steps. First, R is factored $R = GG^H$, (Cholesky factorization). Second, forward substitution is performed per Equation 6. Third, backward substitution is performed per Equation 7.

Utilizing Cholesky decomposition to solve Equation 5 yields highly efficient implementations when R is banded. To estimate an infinite sequence d based on an infinite set of observations r, several assumptions are used. First, the problem is assumed to be causal, which means that $r_i$ cannot depend on $d_j$ for $j > i$. Additionally, the time-dependence is assumed to be finite.

In particular, the following assumptions are made. First, the noise covariance operator $\Sigma$ is banded. This first assumption means that the covariance matrix for any finite subset of elements of n is banded and the bandwidth is upper-bounded by some $W_n$ which can be referred to as the noise covariance bandwidth. Second, $r_i$ does not depend on any $d_j$ for $j < i - W_d$, where $W_d$ is the data operator bandwidth. Neither the noise covariance bandwidth nor the data operator bandwidth have anything to do with the bandwidth of a communication channel.

These assumptions have the following implications. First, the matched filter operation can always be performed using a finite amount of resources with a finite delay. The operator R is banded with bandwidth $W = W_n + W_d$. Banded in this respect means that for any finite subset of natural numbers I, a matrix $R_I$ is formed by taking those elements of R, which have row and column indexes in I. The resulting $R_I$ is a banded matrix and its bandwidth is upper bounded by W.

Unlike the matched filtering operation, the banded nature of R is not sufficient to reduce the problem of solving Equation 5 from an infinite-dimensional operation to a sequence of finite-dimensional operations.

To solve Equation 5, a sliding window Cholesky based equalization can be used. For every $i \in \{0, 1, \ldots\}$, the index set is $I_i = \{i-V, i-V+1, \ldots i+V-1, i+V\}$ when $i > V$ and $I_i = \{0,$ $1, \ldots i+V-1, i+V\}$ when $i \leq V$. For every i, the matched filter vector is $y_i = [y_j]^T$, $j \in I_i$ and the matrix $R_i = R_{I_i}$. $\hat{d}_i$ is obtained by per Equaiton 8.

$$y_i = R_i \hat{d} \qquad \text{Equation 8}$$

The middle, $(V+1)^{th}$, element of the $(2V+1)$-element solution is taken. Since V elements are infront and behind i, this technique is referred to as a symmetric sliding window approximation. However, the number of elements before and after i do not need to be the same, so asymmetric approaches can also be used. In the asymmetric versions, more emphasis is placed either on the past or on the future symbols.

The approximation of an infinite sequence as a window is justified as follows. The inter-dependence of the estimate on a particular symbol on received data typically decreases as distance from symbol of interest increases. As a result, received data points may be neglected outside of a certain range, with negligible degradation in performance. Accordingly, a window around the element of interest can be used, such as a window leading and lagging that element by V. Also, although this approach is applicable for infinite or extremely long sequences, it can also be used for finite or fixed length sequences.

FIG. 1 is a simplified block diagram of a sliding window Cholesky based receiver. An antenna or antenna array 10 receives a communication or multiple communications over a wireless interface. The communication(s) are sampled by a sampling device 12 to produce a received vector r or multiple received vectors, based on the implementation. A channel estimation device 16 estimates a channel response h or channel responses for the communication(s).

A compute channel correlation matrix and sliding window control device 14 receives the samples r and channel response(s) h and produces a channel correlation matrix $R_i$ corresponding to a sliding window around an element i of interest. Also, received samples corresponding to the sliding window $r_{wini}$ are produced. A Cholesky decomposition device 18 factors the channel correlation matrix $R_i$ into a Cholesky factors G and $G^H$. A forward substitution device 20 receives a Cholesky factor and the received samples and performs forward substitution. A backward substitution device 22 receives a Cholesky factor and the output of the forward substitution device 20 and produces soft values for the sliding window. Preferably, backward substitution is only performed on the values of interest, such as the middle values, to reduce complexity.

After discarding the values around the element of interest, a soft value is produced around the value of interest. Typically, this value is a spread symbol of a spread symbol vector d. The spread symbol vector d is despread by a despreader 24 to produce soft data symbols of the received communication(s). Alternately, this value may be the soft symbols themselves of the communication(s) and the despreader 24 is not required.

To analyze the complexity, the complexity of Cholesky decomposition, forward and backward substitution are analyzed. For the analysis, one symbol is used as the elements of interest and a window of V elements prior and post that symbol form the sliding window.

For Cholesky decomposition, the complexity of the square roots involved in Cholesky decomposition is assumed to be a minor part of the overall process. As a result, for a $(2V+1) \times (2V+1)$ matrix with bandwidth W the decomposition requires roughly $(2V+1)(W^2+3W)$ flops. Flop is a floating point operation (complex if the matrices are complex). For forward substitution, roughly $2(2V+1)W$ flops are required. For backward substitution, since only the element of interest are processed, the complexity of this step is $2(V+1)W$ flops.

The total complexity associated with estimation of each data symbol for the symmetric sliding window with width V in flops is then approximately given by $$\text{COMP}_{SW}(V) = 2VW^2 + W^2 + 12VW + 9W \qquad \text{Equation 9}$$

As described above, sliding window based Cholesky Equalization results in complexity that is too high for many commercial communication systems. Accordingly, it is desirable to have a lower complexity technique.

SUMMARY

At least one wireless communication is received and sampled to produce samples. A channel response is estimated corresponding to the at least one wireless communication. An initial channel correlation matrix is produced based on the received samples and the channel response. The initial channel correlation matrix is factorized to produce a Cholesky factor. Forward substitution is performed using the Cholesky factor and received samples to produce initial values for the at least one wireless communication. The Cholesky factor is updated using additional channel correlation matrix values, producing an updated Cholesky factor. Subsequent values for the at least one wireless communication are produced using the updated Cholesky factor.

BRIEF DESCRIPTION OF THE DRAWING(S)

DETAILED DESCRIPTION OF THE PREFERRED EMBODIMENT(S)

Figure 1:
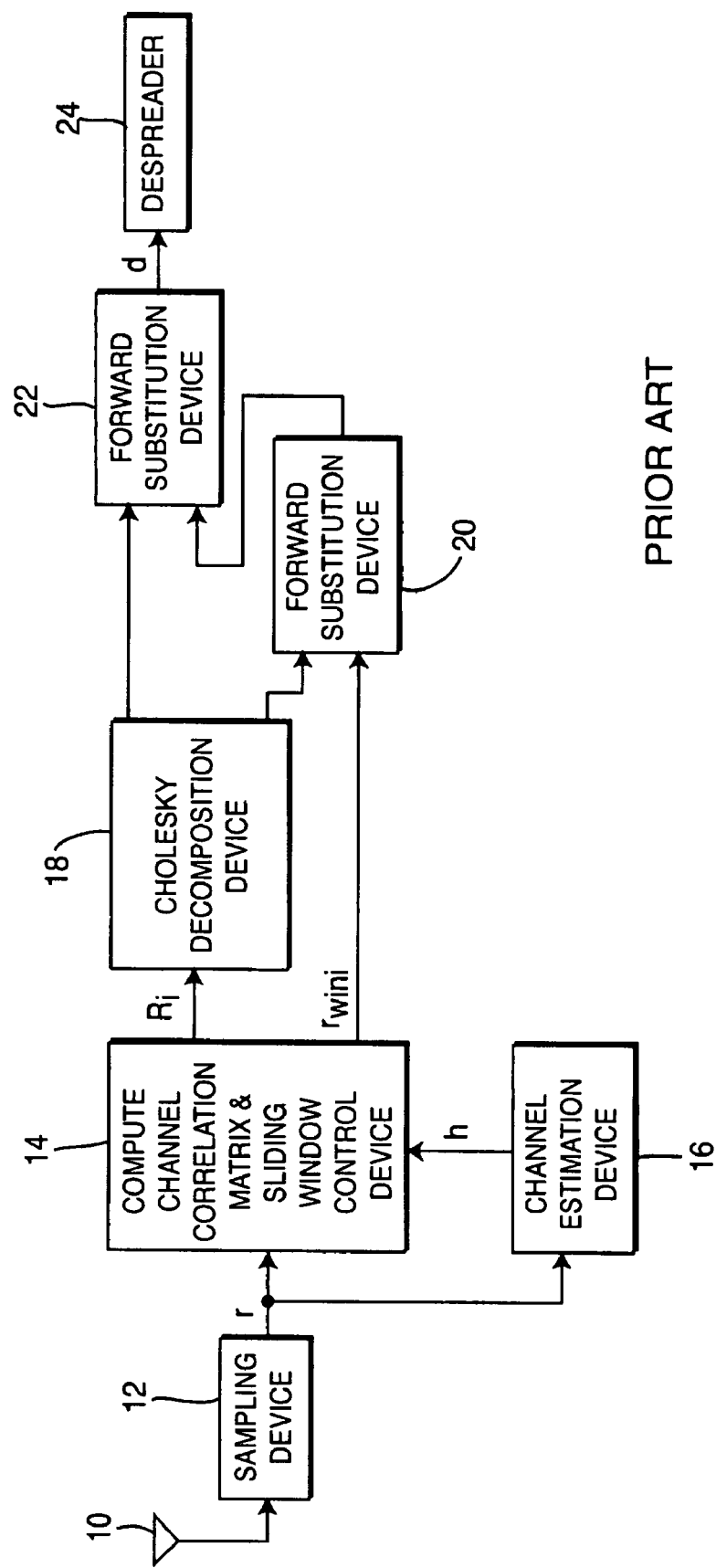
FIG. 1 is a simplified block diagram of a sliding window Cholesky based receiver.

Although the features and elements of the present invention are described in the preferred embodiments in particular combinations, each feature or element can be used alone (without the other features and elements of the preferred embodiments) or in various combinations with or without other features and elements of the present invention.

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a Node-B, site controller, access point or any other type of interfacing device in a wireless environment.

Although sliding window/telescoping based equalization is described in conjunction with a preferred wireless code division multiple access communication system, such as CDMA2000 and universal mobile terrestrial system (UMTS) frequency division duplex (FDD), time division duplex (TDD) modes and time division synchronous CDMA (TD-SCDMA), it can be applied to various communication system and, in particular, various wireless communication systems. It has particular applicability to high data rate communications, such as by high speed data packet access (HSDPA) channels or high data rate CDMA2000 EVDV and CDMA2000 EVDO channels. In a wireless communication system, it can be applied to transmissions received by a WTRU from a base station, received by a base station from one or multiple WTRUs or received by one WTRU from another WTRU, such as in an ad hoc mode of operation.

To solve Equation 5, telescoping Cholesky based equalization is used. For every i∈{0, 1, ... } and some fixed V, an index set is $I_i$={0, 1, ... i+V−1, i+V}. For every i, the matched filter vector is $y_i=[y_j]^T$, j∈$I_i$ and the matrix $R_i=R_{I_i}$ is per Equation 11.

$$y_i = R_i d \qquad \text{Equation 11}$$

Although the element of interest is still the $i^{th}$ element of the solution vector, the quantity V is now a look-ahead window width.

This technique provides an asymmetric sliding window, where the past window width is infinite. Using the banded nature of R, the complexity of Cholesky-decomposition can be reduced, by calculating a Cholesky factor and updating that factor. As a result, a recalculation of the Cholesky factor does not need to be performed for each element/symbol.

To illustrate the updating of the Cholesky factor, the standard Gaxpy Cholesky is expanded so that all operations are element-by-element. An n×n positive semi-definite matrix A is taken and a lower-triangular Cholesky factor G is determined, as follows.

```
1   for i=1:n
2     for j=i:n
3        v=A(j,i)
4        for k = 1:i−1
5           v = v − G(i,k)G(j,k)
6        end
7        if (j=i)
8           scale = sqrt(v)
9        end
10       G(j,i) = v/scale
11    end
12  end
```

To simplify the procedure, instead of recalculating G from scratch for subsequent elements/symbols, the Cholesky factor G can be updated. For updating a limited number of entries in the Cholesky factor G when the matrix A grows by one row and column, the steps affect by the elements A(n,1:n) are determined. For A(n,m) from line 3, G(n,m) is affected by A(n,m), which is the initial value in the computation of G(n,m). While A(n,m) is no longer used directly, it affects other values through G(n,m), which is used to compute these in line 5. From line 5, the computation of other elements of G can be affected in two ways. First, for i=n, since G is lower-triangular there is only 1 non-zero element in its last-column, G(n,n), and this element is in the last row. Second, if j=n, the computation of G(n,m) for m>j is affected. Accordingly, the computation of elements in the last row to the right of itself are affected.

Accordingly, the Cholesky decomposition computation proceeds down and to right through the matrix. If a last row and column to A is added, only the last row G is updated. The update algorithm is as follows.

```
1   for i=1:n
2     v=A(n,i)
3     for k = 1:i−1
4        v = v − G(i,k)G(n,k)
5     end
6     if (j=n)
7        G(n,n) = sqrt(v)
8     else
9        G(n,i) = v/sqrt(G(i,i))
10    end
11  end
```

Since the original matrix is banded with bandwidth W, the Cholesky factor is also banded by W. The above algorithm can be modified as the following.

```
1   for i=n−W:n
2     v=A(n,i)
3     for k = n−W:i−1
4        v = v − G(i,k)G(n,k)
5     end
6     if (j=n)
7        G(n,n) = sqrt(v)
8     else
9        G(n,i) = v/sqrt(G(i,i))
10    end
11  end
```

Figure 2:
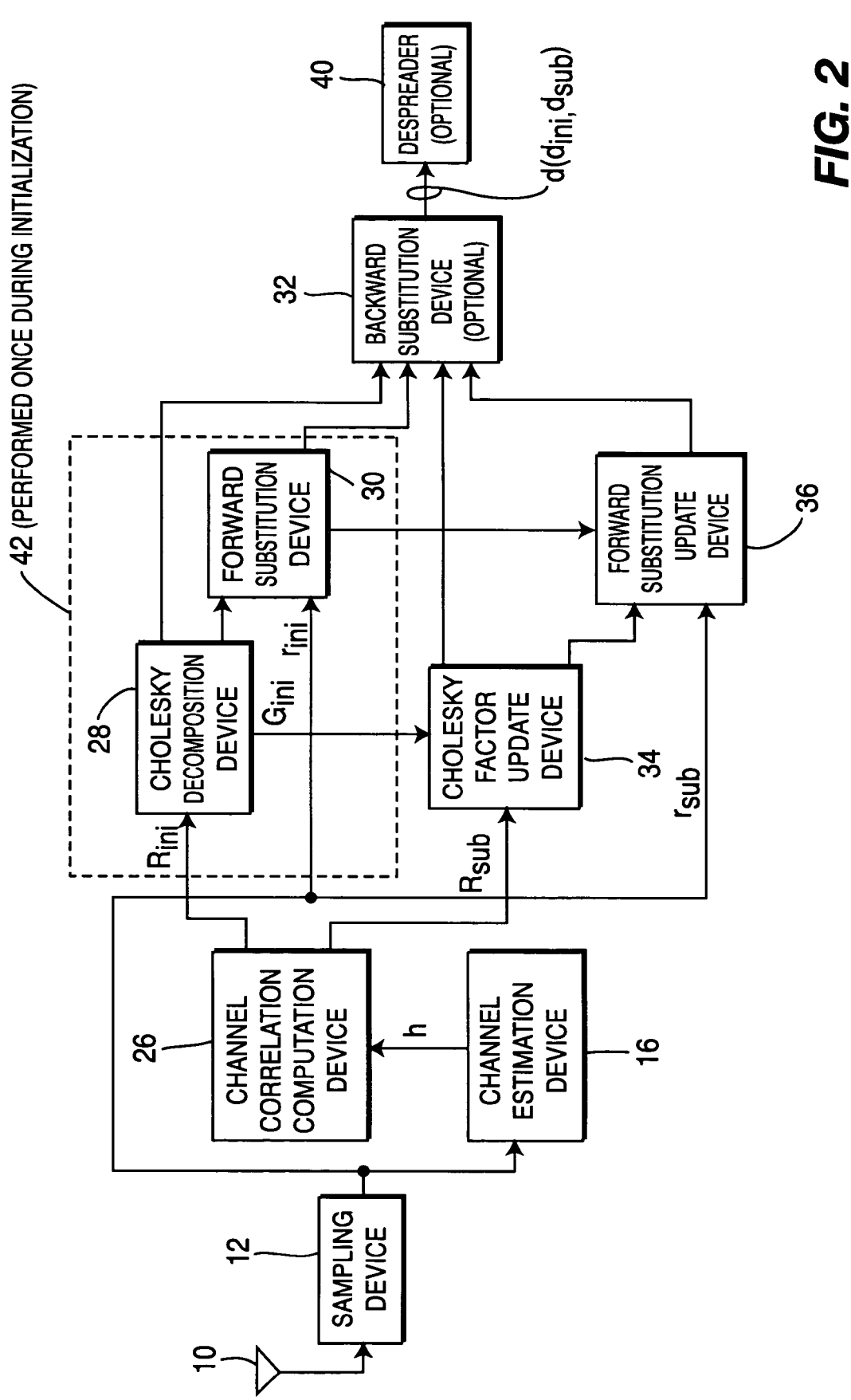
FIG. 2 is a simplified block diagram of a telescoping window Cholesky based receiver.

FIG. 2 is a simplified block diagram of a telescoping Cholesky based equalizer. An antenna or antenna array 10 receives a communication or multiple communications over a wireless interface. The communication(s) are sampled by a sampling device 12 to produce a received vector r or multiple received vectors, based on the implementation. A channel estimation device 16 estimates a channel response h or channel responses for the communication(s).

A channel correlation computation device 26 receives the received vector r and channel response h and produces an initial channel correlation matrix $R_{ini}$. The size of the initial correlation matrix varies based on the implementation. A Cholesky decomposition device 28 factors the channel correlation matrix $R_{ini}$ into Cholesky factors $G_{ini}$ and $G_{ini}^H$. A forward substitution device 30 receives a Cholesky factor and corresponding initial received samples $r_{ini}$ and performs forward substitution. A backward substitution device 32 receives a Cholesky factor and the output of the forward substitution device 30 and produces initial soft value(s), $d_{ini}$.

For values after the initial value, channel correlation matrix values for subsequent values $R_{sub}$ are produced by the channel correlation computation device 26, such as corresponding to a next row and column of A. Using the initial Cholesky factors $G_{ini}$ and $G_{ini}^H$ and the $R_{sub}$ values, an updated Cholesky factor is produced by a Cholesky factor update device 34, such as by producing a new row to the Cholesky factor. A forward substitution update device 36 receives the updated Cholesky factor and prior forward substitution result and adds a last element(s) to the forward substitution result, producing an updated forward substitution result.

The updated forward substitution result and updated Cholesky factor are used by a backward substitution device 32 to produce subsequent soft values for element(s)/symbol(s) of interest. The Cholesky factor update device 34, forward substitution update device 36 and backward substitution update device 38 are sequentially used to produce subsequent values by updating their corresponding matrices/element. The initialization components as shown surrounded by a dashed line 42 are only utilized for initiation. The cumulative result of the output of the backward substitution update device 38 is a vector of subsequent values $d_{sub}$. Typically, the produced vector d (concatenated $d_{ini}$ and $d_{sub}$) is a spread symbol vector. The spread symbol vector d is despread by a despreader 40 to produce soft data symbols of the received communication(s). Alternately, this vector d may be the soft symbols themselves of the communication(s) and the despreader 40 is not required.

Although the elements in FIG. 2 are illustrated as separate elements, these elements may be implemented on a single integrated circuit (IC), such as an application specific integrated circuit (ASIC), multiple ICs, discrete components, or a combination of discrete components and IC(s).

The complexity of this approach is as follows. Ignoring the complexity of the square root (which is only computed one per row update), the computation of G(n,n−1) requires (W−l+1) flops. Thus, the total complexity in flops of each row update is given per Equaiton 12.

$$\text{row update complexity} = \sum_{l=0}^{W} W - l + 1 \qquad \text{Equation 12}$$

$$= \sum_{l=0}^{W} l + 1$$

$$= \frac{(W+1)(W+2)}{2}$$

For forward substitution, the Cholesky decomposition is verified so that it is sufficient to only compute the last row of the Cholesky factor and the size of the original matrix is increased by one. However, with forward substitution, it is self-evident from the nature of the procedure that only the last result of the forward substitution is computed, the previous remain the same. Accordingly, this operation takes W flops.

For backward substitution, V+1 rows are processed to the compute the symbol of interest. Therefore, the complexity of backward substitution with comparison to sliding window Cholesky based equalization remains the same, 2(V+1)W flops. The backward substitution component is the only step of the telescoping window procedure that depends on V, which is desirable since good performance typically requires that V>>W. Accordingly, the total complexity in flops per symbol is per Equation 13.

$$\text{COMP}_{TW}(V) = 0.5W^2 + 4.5W + 2VW + 1 \qquad \text{Equation 13}$$

Additionally, to further reduce the complexity with some sacrifice to performance, omitting the backward substitution results in tremendous complexity savings since this removes any dependence on V in complexity and V>>W by assumption. Referring to FIG. 2, the ouput of forward substitution device 30 and forward substitution update device 36 are concatenated to produce d. This omission also dramatically reduces the memory requirements, as described below. This is in contrast to the sliding window Cholesky based approach where omitting the backward substation results in much lower complexity savings since forward substitution depends on V as well as the backwards substitution.

The memory requirements for the sliding window and telescoping window based equalization are as follows. The memory requirements for the sliding window approach are bounded. With the telescoping window, the whole matrix cannot be saved. The information requirement for each step is driven by 2 factors: the Cholesky decomposition which requires previous values up to W rows back and the back-substitution which requires the previous values up to V rows back. The larger of the two values determines the sub-matrix of $R_i$ and the sub-vector of $y_i$ are saved. Since typically, there are V>>W, the memory requirement is typically driven by the look-ahead window width. Accordingly, the telescoping window based equalization is preferably only used for a banded operator R. Otherwise both the number of operations and the memory required grow without bound with i.

What is claimed is:

1. A method comprising:
   receiving at least one wireless communication and sampling the received wireless communication producing samples;
   estimating a channel response corresponding to the samples of the at least one wireless communication;
   producing an initial channel correlation matrix based on the received samples and the channel response;
   factorizing the initial channel correlation matrix to produce a Cholesky factor;
   performing forward substitution using the Cholesky factor and received samples to produce initial values for the at least one wireless communication;
   updating the Cholesky factor using additional channel correlation matrix values producing an updated Cholesky factor; and
   producing subsequent values for the at least one wireless communication using the updated Cholesky factor.

2. The method of claim 1 further comprising performing backward substitution on a result of the forward substitution to produce the initial values for the at least one wireless communication.

3. The method of claim 1 wherein the initial and subsequent values are spread symbols and the spread symbols are despread to produce soft symbols of the at least one communication.

4. The method of claim 1 wherein the initial and subsequent values are soft symbols.

5. The method of claim 1 wherein the producing subsequent values is sequentially performed so that only one subsequent value is produced at a time.

6. The method of claim 1 wherein backward substitution is not performed to detect symbols of the at least one communication.

7. A wireless transmit/receive unit (WTRU) comprising:
   an antenna or antenna array for receiving at least one wireless communication;
   a sampling device configured to receive the at least one wireless communication and produce samples of the at least one received wireless communication;
   a channel estimation device for estimating a channel response corresponding to the samples of the at least one wireless communication;
   a channel correlation computation device configured to receive the channel response and produce an initial channel correlation matrix and update values for the initial channel correlation matrix;
   a Cholesky decomposition device configured to receive the initial channel correlation matrix and produce an initial Cholesky factor;
   a forward substitution device configured to receive initial samples of the samples and the initial Cholesky factor and perform forward substitution and producing initial values of the at least one wireless communication;
   a Cholesky factor update device configured to receive the update values for the initial channel correlation matrix and the initial Cholesky factor and produce values of an updated Cholesky factor;
   a forward substitution update device for receiving the updated Chole sky factor and a result of the forward substitution device and produce subsequent values of the at least one communication.

8. The WTRU of claim 7 further comprising a backward substitution device configured to receive an output of the forward substitution device, an output of the forward substitution update device, the initial Cholesky factor and the updated Cholesky factor and perform backward substitution.

9. A base station comprising:
   an antenna or antenna array for receiving at least one wireless communication;

a sampling device configured to receive the at least one wireless communication and produce samples of the at least one received wireless communication;

a channel estimation device for estimating a channel response corresponding to the samples of the at least one wireless communication;

a channel correlation computation device configured to receive the channel response and produce an initial channel correlation matrix and update values for the initial channel correlation matrix;

a Cholesky decomposition device configured to receive the initial channel correlation matrix and produce an initial Cholesky factor;

a forward substitution device configured to receive initial samples of the samples and the initial Cholesky factor and perform forward substitution and producing initial values of the at least one wireless communication;

a Cholesky factor update device configured to receive the update values for the initial channel correlation matrix and the initial Cholesky factor and produce values of an updated Cholesky factor;

a forward substitution update device for receiving the updated Cholesky factor and a result of the forward substitution device and produce subsequent values of the at least one communication.

10. The base station of claim 9 further comprising a backward substitution device configured to receive an output of the forward substitution device, an output of the forward substitution update device, the initial Cholesky factor and the updated Cholesky factor and perform backward substitution.

11. An integrated circuit comprising:

an input configured to receive samples of at least one wireless communication;

a channel estimation device for estimating a channel response corresponding to the samples of the at least one wireless communication;

a channel correlation computation device configured to receive the channel response and produce an initial channel correlation matrix and update values for the initial channel correlation matrix;

a Cholesky decomposition device configured to receive the initial channel correlation matrix and produce an initial Cholesky factor;

a forward substitution device configured to receive initial samples of the samples and the initial Cholesky factor and perform forward substitution and producing initial values of the at least one wireless communication;

a Cholesky factor update device configured to receive the update values for the initial channel correlation matrix and the initial Cholesky factor and produce values of an updated Cholesky factor;

a forward substitution update device for receiving the updated Cholesky factor and a result of the forward substitution device and produce subsequent values of the at least one communication.

12. The integrated circuit of claim 11 further comprising a backward substitution device configured to receive an output of the forward substitution device, an output of the forward substitution update device, the initial Cholesky factor and the updated Cholesky factor and perform backward substitution.

* * * * *

UNITED STATES PATENT AND TRADEMARK OFFICE
CERTIFICATE OF CORRECTION

PATENT NO. : 7,400,692 B2  Page 1 of 2
APPLICATION NO. : 11/018097
DATED : July 15, 2008
INVENTOR(S) : Alexander Reznik It is certified that error appears in the above-identified patent and that said Letters Patent is hereby corrected as shown below:

ON THE TITLE PAGE

At Item (56), U.S. PATENT DOCUMENTS, page 3, left column, line 19, on the line beginning with "6,697,441", after "2/2004", delete "Bottemley et al.", and insert therefor --Bottomley et al.--.

At Item (56), U.S. PATENT DOCUMENTS, page 4, right column, line 25, on the line beginning with "2003/0227960", after "12/2003", delete "Papaskellariou", and insert therefor --Papasakellariou--.

At Item (56), U.S. PATENT DOCUMENTS, page 4, right column, line 40, on the line beginning with "2004/0032900", after "2/2004", delete "Homg et al.", and insert therefor --Horng et al.--.

At Item (56), FOREIGN PATENT DOCUMENTS, page 5, left column, line 1, before line beginning with "EP 0715421", insert --EP  0642243 A1    9/1993
  EP  0607755 A1   12/1993
  EP  0674455 A1   10/1994
  EP  0691754 A2    1/1996
  EP  0701344 A1    3/1996--.

At column 1, line 24, after the word "network", delete "nodes", and insert therefor --node--.

At column 1, line 36, after the words "communications and", delete "a", and insert therefor --an--.

At column 1, line 44, before the words "an infinite", delete "handing", and insert therefor --handling--.

Signed and Sealed this

Twenty-fifth Day of May, 2010

David J. Kappos
*Director of the United States Patent and Trademark Office*

CERTIFICATE OF CORRECTION (continued)
U.S. Pat. No. 7,400,692 B2

At column 1, line 56, after the word "relationships", delete "$E[n_i n^*_j]^* = \sum_{i,j};$", and insert therefor -- $E[n_i n^*_j] = \sum_{i,j};$ --.

At column 3, line 39, before the word "Cholesky", delete "a".

At column 4, line 1, after the word "interest", delete "are", and insert therefor --is--.

At column 4, line 58, after the word "communication", delete "system", and insert therefor --systems--.

At column 5, line 39, before the words "by the", delete "affect", and insert therefor --affected--.

At column 5, line 52, after the words "and to", insert --the--.

At column 7, line 45, before the word "results", delete "substation", and insert therefor --substitution--.

At claim 7, column 8, line 57, after the word "updated", delete "Chole sky", and insert therefor --Cholesky--.